June 15, 1937.  E. L. WOODBURY  2,083,586
SAW FILING GAUGE
Filed May 2, 1935
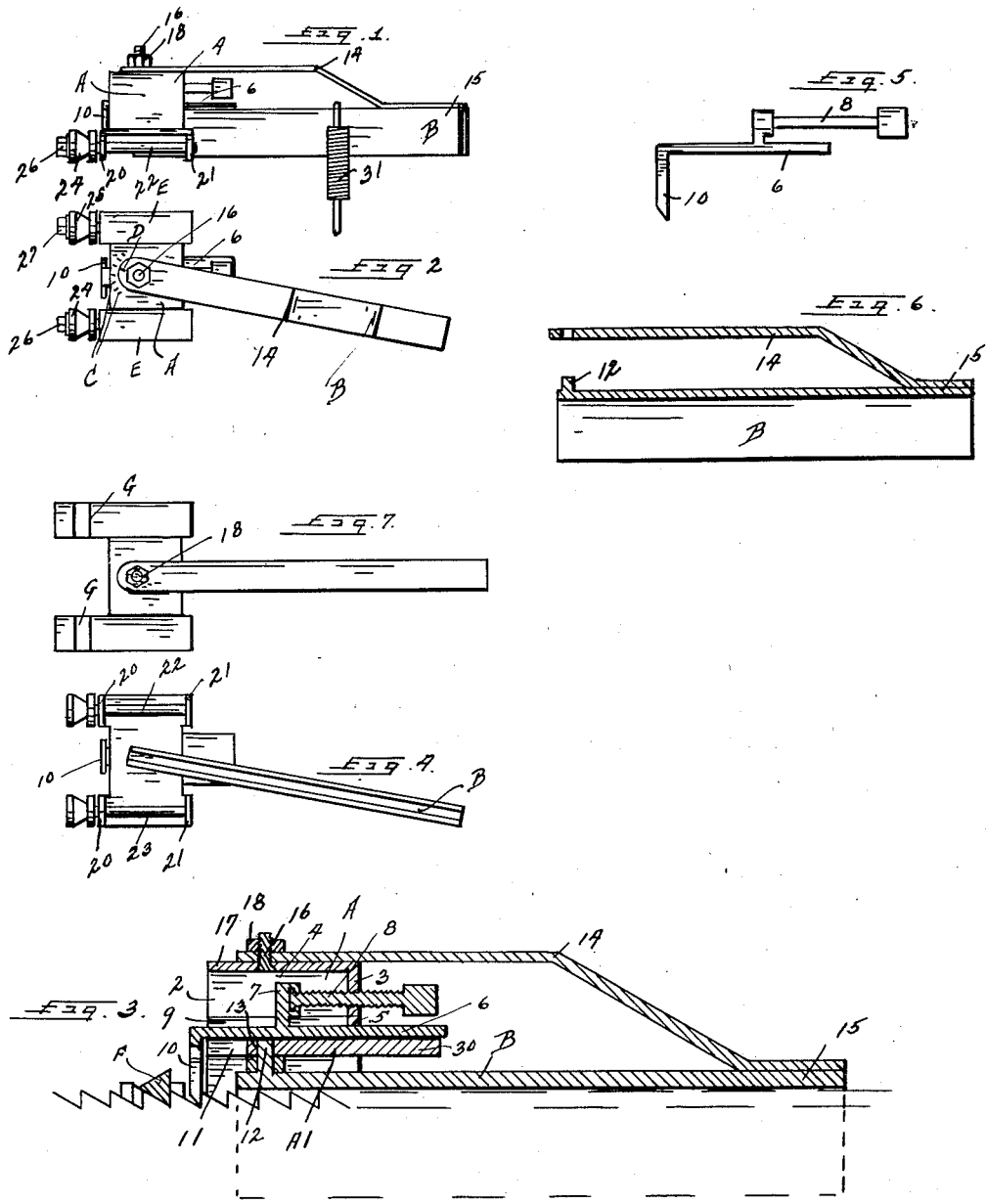
Inventor
Elias L. Woodbury
By R. M. Thomas
Attorney Patented June 15, 1937

2,083,586

UNITED STATES PATENT OFFICE 2,083,586

SAW FILING GAUGE

Elias L. Woodbury, Salt Lake City, Utah, assignor of forty per cent to Hugh B. Sprague and forty per cent to Clarence I. Justheim, both of Salt Lake City, Utah Application May 2, 1935, Serial No. 19,449

2 Claims. (Cl. 76—31)

My invention relates to hand saws and has for its object to provide a new and efficient device for filing such saws, which will provide uniform filing of all teeth, equal depth to each tooth, and equal pitch to each tooth.

A further object is to provide a saw filing gauge which when a sample tooth has been filed, either in the middle of the saw or at either end, the rest of the teeth will be filed in exact duplicate of this first tooth with the depth, pitch, and angle of filing being all alike.

A still further object is to provide a file gauge and guide which will hold the file in rotating beveled guide wheels and will prevent the file from cutting too deep, or at the wrong angle or pitch and which rotating of the wheels prevents their wearing or being cut by the file.

These objects I accomplish with the device illustrated in the accompanying drawing in which similar numerals and letters of reference indicate like parts throughout the several views and as described in the specification forming a part of this application and pointed out in the appended claims.

In the drawing

Figure 1 is a side elevation of the device.

Figure 2 is a plan view of Figure 1.

Figure 3 is a section longitudinally through the device, enlarged over the size of the other views, with the file shown as F, sectioned, as when being used.

Figure 4 is a side elevation of the tooth set guide to sharpen the saw tooth.

Figure 5 is a vertical section of the saw blade engaging groove and brace.

Figure 6 is an inverted plan view of the device.

Figure 7 is a plan view of a modified way of building the device with stationary file guides.

In the drawing in which I have shown my device, I have shown the body of the device as A which is made of a rectangular shaped body having the bottom, sides, and the back end closed with the front end open at 2. Through the back 3 and along the sides 4, I provide a slot 5 in each side and through the back and a guide rail 9 is formed on the inside of each side 4 to guide the plate 6 and in which slot 5 the adjustable plate 6 is carried. The top side of the plate 6 carries a block 7 into which an adjustment screw 8 is rotatably secured and the screw 8 is passed out through the back 3 through a threaded hole and the end of the screw is provided with a head by which the screw may be rotated to move the plate 6 forward or backward through the body.

The front end of the plate 6 is turned down to form a tooth engaging gauge member 10 with the bottom edge of the member beveled to engage into the bottom of the tooth of the saw which is to be sharpened. This tooth engaging member is the guide which is set to enable the person sharpening the saw to be sure that each tooth is the same length, pitch, and depth. The front edge of the bottom 41 of the body A is cut away at 11 to allow the gauge member to be drawn back under the body when filing certain large toothed saws.

A saw blade engaging channel body B is pivotally secured to the body A by inserting the pivot pin 12 into a hole 13 in the bottom A1 of the body and the channel body is held in fixed horizontal relation to the body by a bracket 14 which has one end secured to the free end 15 of the channel and the other end bored to fit onto a pivot locking stud bolt 16 which bolt is secured through the top 17 of the body A directly in alignment with the hole 13 in the bottom A1 so that when the bracket is carried on the stud bolt the entire channel will be held in the proper horizontal position.

A nut 18 is screwed onto the bolt 16 to allow for tightening down onto the bracket and holding the bracket and channel in fixed predetermined relation to the body. This is to provide for angle adjustment of the body to the saw to insure that all tooth cuts are made at the proper angle to the saw body which is carried in the channel B. Thus, the angle and length of the teeth is controlled.

Onto each side of the body I provide extended plates E each carrying depending spaced apart brackets 20 and 21 with each set of brackets carrying a shaft 22 or a shaft 23 with the ends of the shafts extending out beyond the body A. The shafts 22 and 23 carry rotatable pitch depth file guide rollers 24 and 25 respectively held thereon by nuts 26 and 27. The rollers are provided with an angled annular groove therein with one side of the groove at right angles to the axis of the roller and the other side of the groove is in a slope or angle desired to fit the tooth to be sharpened. Different sets of rollers will be provided with each instrument to allow for sharpening of different angled teeth.

If desired for filing the last teeth on a saw the rollers may be made double with opposite angles, one on each end of the rollers, or the rollers may be reversed on the shaft.

As a means of quick setting of the device for filing the saw, the top side of the body A is provided with indicia marks C to indicate what angle the saw is set at and the bracket 14 is marked with one mark D to be brought into alignment with any desired mark of the body before setting the channel. Also the bottom A1 may be provided with an extension 30 on the back side thereof to indicate the setting of the screw 8 with indicia marks on the top side of the said extension.

A coil spring 31 is provided to be engaged over the top of the channel B and over the bottom edge of the saw to hold the entire device onto the saw in fixed relation thereto; however other types or means of securing the device to the saw may be used without departing from the spirit of the invention or the scope of the claims.

In Figure 7, I have shown a plan view of a modified form of the device in which the file guides G are stationary and made of some very hard metal which will not wear quickly or if desired, balls or rollers might be mounted in the stationary pieces to allow the file to glide thereover without cutting.

Having thus described my invention, I desire to secure by Letters Patent and claim:

1. In a guide for filing saws, the combination of a saw blade engaging channel to fit down over the teeth and onto the sides of the saw blade; a body pivotally secured to said channel to be set at the angle to the channel to fit the angle of the teeth of the saw; brackets extending from said body carrying forwardly extended shafts; file guide rollers carried on said shafts, said guides having angled annular notches therein into which the file is adapted to fit when filing the teeth; and an adjustable tooth engaging member carried longitudinally in said body and adjustable longitudinally thereof with one end turned down to engage the teeth of the saw to hold the file in proper position for filing each successive tooth of the saw.

2. In a saw guide for filing saws, the combination of a channel adapted to fit along the saw blade with the sides extending down each side of the saw blade; a bracket extending from one end of said channel to near the other end but spaced therefrom; a body pivotally secured between the bracket and said channel; means to set said body at any predetermined angle to said channel; brackets extending out and down from each side of said body; shafts carried in said brackets longitudinally of said body; file guide rollers mounted onto the front extended end of said shafts, said rollers having angled annular grooves therearound to receive the file, said grooves to gauge the filing of the saw for depth and gauge; an adjustable tooth engaging member carried longitudinally in said body and adjustable longitudinally thereof with one end turned down to engage the teeth of the saw to hold the file in proper position for filing the saw tooth.

ELIAS L. WOODBURY.